(12) United States Patent
Lee et al.

(10) Patent No.: US 12,435,376 B2
(45) Date of Patent: Oct. 7, 2025

(54) METHOD FOR HIGH-SENSITIVITY AND HIGH-SPECIFICITY DETECTION OF BIOMOLECULES BY USING MASS SPECTROMETRY

(71) Applicant: Korea Research Institute of Standards and Science, Daejeon (KR)

(72) Inventors: Tae Geol Lee, Daejeon (KR); Hee-Kyung Na, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1233 days.

(21) Appl. No.: 17/271,699

(22) PCT Filed: Sep. 3, 2018

(86) PCT No.: PCT/KR2018/010217
§ 371 (c)(1),
(2) Date: Feb. 26, 2021

(87) PCT Pub. No.: WO2020/045713
PCT Pub. Date: Mar. 5, 2020

(65) Prior Publication Data
US 2021/0318304 A1   Oct. 14, 2021

(30) Foreign Application Priority Data
Aug. 31, 2018   (KR) .................. 10-2018-0103995

(51) Int. Cl.
*C12Q 1/6886* (2018.01)
*G01N 33/53* (2006.01)

(52) U.S. Cl.
CPC ....... *C12Q 1/6886* (2013.01); *G01N 33/5308* (2013.01); *G01N 2610/00* (2013.01); *G01N 2800/00* (2013.01)

(58) Field of Classification Search
CPC .......................... C12Q 1/6886; G01N 2800/00
See application file for complete search history.

(56) References Cited

U.S. PATENT DOCUMENTS 5,292,636 A * 3/1994 Kung .................. G01N 33/571
435/974
8,283,117 B2  10/2012 Lee et al.

2011/0034538 A1 * 2/2011 Croce ..................... A61P 35/00
435/325
2011/0095179 A1 * 4/2011 Lee ..................... G01N 33/6851
250/282
2013/0122516 A1 * 5/2013 Hong ................. G01N 33/6848
435/7.1

FOREIGN PATENT DOCUMENTS

KR   1020090122638 A   12/2009

OTHER PUBLICATIONS

Liu R, Liu X, Tang Y, Wu L, Hou X, Lv Y (2011) "Highly sensitive immunoassay based on immunogold-silver amplification and inductively coupled plasma mass spectrometric detection", analytical chemistry, 83, pp. 2330-2336 (Year: 2011).*
2015.*
Na et al., "Discrimination of single nucleotide mismatches using a scalable, flexible, and transparent three-dimensional hanostructure-based plasmonic miRNA sensor with high sensitivity", Biosensor and Bioelectronics, 2018, vol. 113, pp. 39-45.
Park et al., "TOF-SIMS analysis of an isocitrate dehydrogenase 1 mutation-associated oncometabolite in cancer cells", Biointerphases, 2018, vol. 13:3, pp. 03B404-1-03B404-5.
Sagie et al., "Advances in localized surface plasmon resonance spectroscopy biosensing", Nanomedicine, 2011, vol. 6:8, pp. 1447-1462.
Takikawa et al., "Proteomic analysis of a highly metastatic gastric cancel cell line using two-dimensional differential gel electrophoresis", Oncology Reports, 2006, vol. 16, pp. 705-711.

\* cited by examiner

*Primary Examiner* — Changhwa J Cheu
(74) *Attorney, Agent, or Firm* — The Webb Law Firm

(57) ABSTRACT

The present invention relates to a method for high-sensitivity and high-specificity detection of biomolecules by using mass spectrometry and, more specifically, to a method for high-sensitivity and high-specificity detection of proteins such as miRNA or antigens by using time-of-flight secondary ion mass spectrometry (ToF-SIMS), matrix-assisted laser desorption/ionization (MALDI), or laser desorption/ionization (LDI) mass spectrometry. The method for high-sensitivity and high-specificity detection of biomolecules by using mass spectrometry, according to the present invention, enables high-sensitivity and high-specificity detection of biomolecules by using surface mass spectrometry, and the method is expected to be used for the diagnosis and prediction of diseases by quantifying, from a biosample, a target probe such as miRNA which is known as a disease marker.

11 Claims, 12 Drawing Sheets

Specification includes a Sequence Listing.

[FIG. 2C]
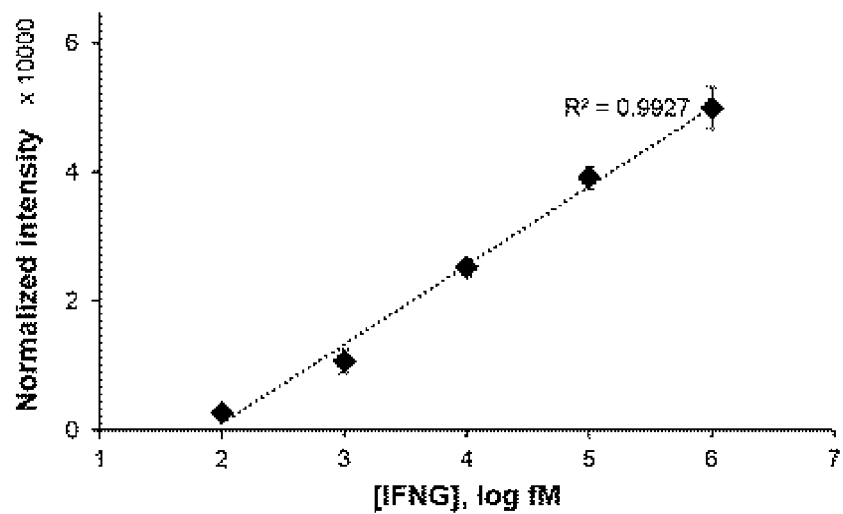
[FIG. 3A]
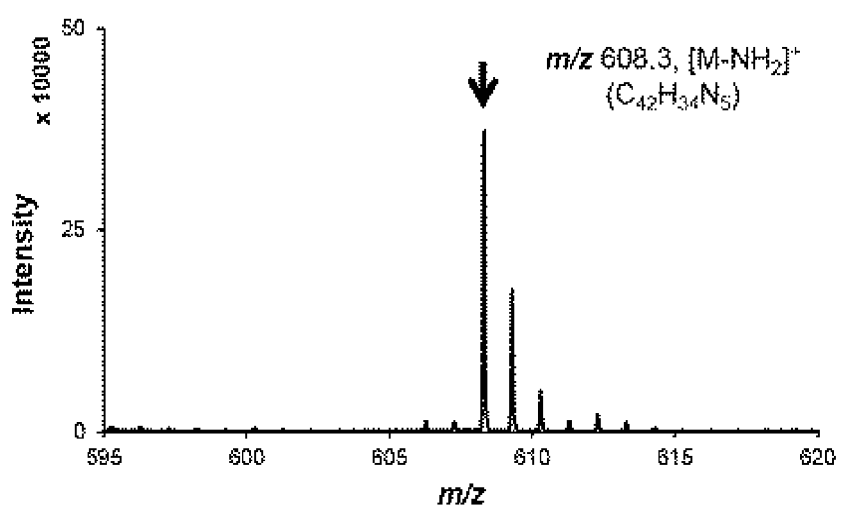

[FIG. 3B]
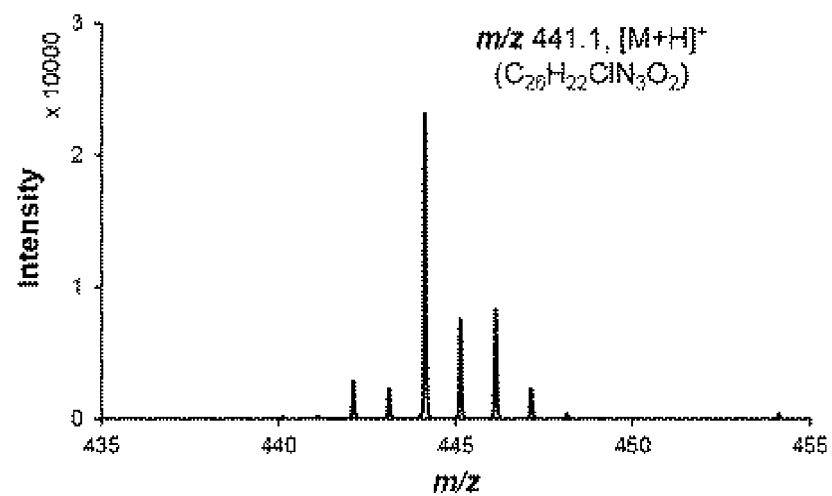
[FIG. 3C]
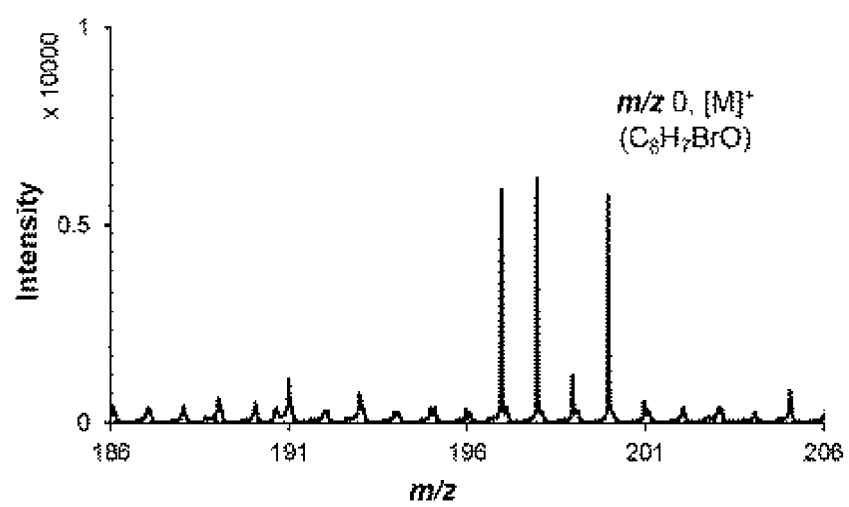

[FIG. 5]

SEQUENCE LISTING

<160> NUMBER OF SEQ ID NOS: 11

<210> SEQ ID NO 1
<211> LENGTH: 22
<212> TYPE: RNA
<213> ORGANISM: Artificial Sequence
<220> FEATURE:
<223> OTHER INFORMATION: miR-200a-3p

<400> SEQUENCE: 1
uaacacuguc ugguaacgau gu                                              22

<210> SEQ ID NO 2
<211> LENGTH: 22
<212> TYPE: RNA
<213> ORGANISM: Artificial Sequence
<220> FEATURE:
<223> OTHER INFORMATION: miR-let-7a

<400> SEQUENCE: 2
ugagguagua gguuguauag uu                                              22

<210> SEQ ID NO 3
<211> LENGTH: 22

<212> TYPE: RNA
<213> ORGANISM: Artificial Sequence
<220> FEATURE:
<223> OTHER INFORMATION: miR-let-7c

<400> SEQUENCE: 3
ugagguagua gguuguaugg uu                                          22

<210> SEQ ID NO 4
<211> LENGTH: 22
<212> TYPE: RNA
<213> ORGANISM: Artificial Sequence
<220> FEATURE:
<223> OTHER INFORMATION: miR-let-7f

<400> SEQUENCE: 4
ugagguagua gauuguauag uu                                          22

<210> SEQ ID NO 5
<211> LENGTH: 37
<212> TYPE: DNA
<213> ORGANISM: Artificial Sequence
<220> FEATURE:
<223> OTHER INFORMATION: Hairpin probe for detection of miR-200a-3p

<400> SEQUENCE: 5
gcctaacact gtacatcgtt accagacagt gttaggc                          37

<210> SEQ ID NO 6
<211> LENGTH: 35
<212> TYPE: DNA
<213> ORGANISM: Artificial Sequence
<220> FEATURE:
<223> OTHER INFORMATION: Hairpin probe for detection of miR let-7a

<400> SEQUENCE: 6
ggcaactata caacctacta cctcatatag ttgcc                            35

<210> SEQ ID NO 7
<211> LENGTH: 10
<212> TYPE: DNA
<213> ORGANISM: Artificial Sequence
<220> FEATURE:
<223> OTHER INFORMATION: Signaling probe for detection of miR-200a-3p

<400> SEQUENCE: 7
agtgttaggc                                                        10

<210> SEQ ID NO 8
<211> LENGTH: 10
<212> TYPE: DNA
<213> ORGANISM: Artificial Sequence
<220> FEATURE:
<223> OTHER INFORMATION: Signaling probe for detection of miR-let-7a

<400> SEQUENCE: 8
ggcaactata                                                        10

<210> SEQ ID NO 9
<211> LENGTH: 22
<212> TYPE: RNA
<213> ORGANISM: Artificial Sequence
<220> FEATURE:
<223> OTHER INFORMATION: miR-let-7a

<400> SEQUENCE: 9

```
ugagguagua gguuguauag uu                                                     22

<210> SEQ ID NO 10
<211> LENGTH: 22
<212> TYPE: RNA
<213> ORGANISM: Artificial Sequence
<220> FEATURE:
<223> OTHER INFORMATION: Comparative Example 1 (miR-let-7c)

<400> SEQUENCE: 10
ugagguagua gguuguaugg uu                                                     22

<210> SEQ ID NO 11
<211> LENGTH: 22
<212> TYPE: RNA
<213> ORGANISM: Artificial Sequence
<220> FEATURE:
<223> OTHER INFORMATION: Comparative Example 2 (miR-let-7f)

<400> SEQUENCE: 11
ugagguagua gauuguauag uu                                                     22
```

METHOD FOR HIGH-SENSITIVITY AND HIGH-SPECIFICITY DETECTION OF BIOMOLECULES BY USING MASS SPECTROMETRY

CROSS-REFERENCE TO RELATED APPLICATIONS

This application is the United States national phase of International Application No. PCT/KR2018/010217 filed Sep. 3, 2018, and claims priority to Korean Patent Application No. 10-2018-0103995 filed Aug. 31, 2018, the disclosures of which are hereby incorporated by reference in their entirety.

The Sequence Listing associated with this application is filed in electronic format via Patent Center and is hereby incorporated by reference into the specification in its entirety. The name of the text file containing the Sequence Listing is 2101191_ST25.txt. The size of the text file is 2,607 bytes, and the text file was created on May 6, 2025.

BACKGROUND OF THE INVENTION

Field of the Invention

The present invention relates to a method for high-sensitivity and high-specificity detection of biomolecules by using mass spectrometry, and more particularly, to a method for high-sensitivity and high-selectivity detection of proteins such as miRNAs, antigens, or the like by using time-of-flight secondary ion mass spectrometry (ToF-SIMS), Matrix-assisted laser desorption/ionization (MALDI), or laser desorption/ionization (LDI) mass spectrometry.

Description of Related Art

MicroRNAs (miRNAs/miRs) are associated with various biological and pathological phenomena in living organisms, and it is very important to detect such valuable biomarkers. However, because they are present in a small amount, fragile, and have similarities between their sequences, it is generally difficult to detect the miRNAs. As a result, a platform for detection of the miRNAs requires sensitivity, sequence-specificity, no labeling of a target, and a multiplex assay.

A polymerase chain reaction (PCR), next-generation sequencing, fluorescence resonance energy transfer, an electrochemistry-based method, a localized surface plasmon resonance-based method, and a mass spectrometry (MS)-based method are used to meet these requirements. Many of them depend on the optical reading technology.

Among them, mass spectrometry is a useful reading tool because it provides molecular weight information. Mass spectrometry can provide critical information that may be used in a multiplex assay without any labeling of an analyte because it can measure an exact molecular weight (a mass-to-charge ratio, m/z) of a molecule and identify a unique isotopic pattern for a certain material. In particular, time-of-flight secondary ion mass spectrometry (ToF-SIMS) is a potent surface analysis tool that may measure small molecules on a surface with high sensitivity and image the small molecules, and thus this is performed without matrix treatment which often hinders the analysis by MALDI-ToF.

The detection of biomolecules is critical, but it is of very substantial biological importance to understand the relationship between the biomolecules. However, mass spectrometry is not suitable for detection of a trace of biomolecules and non-covalent protein-protein and DNA-RNA interactions. Also, the identification of biomolecules using mass spectrometry often requires separation or decomposition of a biological mixture. In fact, there has been an attempt to amplify a large amount of a tag-based signal in order to overcome the limitations of mass spectrometry for the detection of biomolecules, but this is mainly based on extensive deformations such as binding of small molecules or nanoparticles to antibodies. Therefore, there is an urgent demand for the development of a novel mass fingerprint that increases sensitivity to a target signal without any deformation or modification which may affect an interaction with a target, and has high target specificity.

As one example, the detection of miRNA using mass spectrometry also needs to be improved in terms of cost and time because it requires an additional step of amplifying a gene by PCR, and subsequent reverse transcription (RT), and labeling (including labeling of an isotope), or sequencing.

Accordingly, there is an urgent demand for development of a more effective method that does not require such an additional step for detection of biomolecules.

DISCLOSURE

Technical Problem

To solve the above problems of the prior art, an object of the present invention is to provide a method for high-sensitivity and high-specificity detection of biomolecules by using mass spectrometry, and, more specifically, to a method for high-sensitivity and high-specificity detection and quantification of biomolecules such as miRNAs, antigens or the like by using time-of-flight secondary ion mass spectrometry (ToF-SIMS), matrix-assisted laser desorption/ionization (MALDI), or laser desorption/ionization (LDI) mass spectrometry.

Another object of the present invention is to provide a method for use as a marker for diagnosis and prediction of diseases such as cancer by detecting target miRNAs, antigens, or the like in a biological sample using the method for quantification of biomolecules.

Technical Solution

In one general aspect, a method for quantification of biomolecules by using mass spectrometry includes generating a precipitate by means of an enzymatic reaction in which a substrate reacts with an enzyme to which biomolecules or a biomolecule complex is bound.

The method for quantification of biomolecules is not limited as long as it does not hinder achievement of the objects of the present invention, but may further include the following steps:
fixing a first probe molecule in a metal; and
reacting the biomolecules with the fixed first probe molecule to form a biomolecule complex.

The method for quantification of biomolecules is not limited as long as it does not hinder achievement of the objects of the present invention, but may further include quantifying the biomolecules. The following steps may also be performed sequentially after the step of forming the biomolecule complex:
reacting a second probe molecule with the biomolecule complex, which is formed by reacting the biomolecules with the fixed first probe molecule, so that the second probe molecule binds to the biomolecule complex; and binding an enzyme conjugate to the bound second probe molecule.

The biomolecules are not limited as long as they do not hinder achievement of the objects of the present invention, but may be cells, DNA, RNA, a gene, a small-molecule material, microRNA (miRNA), or a protein.

The first probe molecule is not limited as long as it does not hinder achievement of the objects of the present invention, but may be fixed on a surface of the metal through thiol-modification.

The enzyme conjugate is not limited as long as it does not hinder achievement of the objects of the present invention, but may be a conjugate in which a material interacting with the second probe molecule is conjugated with an enzyme.

The protein is not limited as long as it does not hinder achievement of the objects of the present invention, but may be an antigen.

The biomolecules are not limited as long as they do not hinder achievement of the objects of the present invention, but may be microRNA (miRNA).

When the biomolecules are an antigen, the first probe molecule is not limited as long as it does not hinder achievement of the objects of the present invention, but may be an antibody that binds to the biomolecules.

When the biomolecules are miRNA, the first probe molecule is not limited as long as it does not hinder achievement of the objects of the present invention, but may have a hairpin structure having a sequence complementary to the biomolecules.

The second probe molecule is not limited as long as it does not hinder achievement of the objects of the present invention, but may include a biotinylated signaling probe, and the enzyme conjugate may be fixed in the biotinylated signaling probe by binding to the biotinylated signaling probe.

The enzyme is not limited as long as it does not hinder achievement of the objects of the present invention, but may include any one or two or more selected from the group consisting of horseradish peroxidase (HRP), alkaline phosphatase (AP), and β-galactosidase (β-gal).

The substrate is not limited as long as it does not hinder achievement of the objects of the present invention, but may include any one or two or more selected from the group consisting of 4-chloronaphthol, 3,3'-AEC(3-amino-9-ethyl-carbazole (DAB), 3,3',5,5'-tetramethylbenzidine (TMB), 5-bromo-4-chloro-3-indolyl phosphate (BCIP)/nitro blue tetrazolium (NBT), 4-chloro-2-methylbenzenediazonium/3-hydroxy-2-naphthoic acid 2,4-dimethylanilide phosphate (TR/Naphthol AS-MX), 5-bromo-4-chloro-3-indolyl β-D-galactopyranoside (X-gal), 3,4-cyclohexenoesculetin β-D-galactopyranoside (S-gal), 5-bromo-3-indolyl β-D-galactopyranoside (Bluo-gal), and 6-chloro-3-indolyl-β-D-galactopyranoside (Red-gal).

The mass spectrometry is not limited as long as it does not hinder achievement of the objects of the present invention, but may, for example, be surface mass spectrometry, and may be, as one more specific example, time-of-flight secondary ion mass spectrometry (ToF-SIMS), matrix-assisted laser desorption/ionization mass spectrometry (MALDI-mass spectrometry or MALDI-MS), laser desorption/ionization mass spectrometry (LDI-MS), desorption electrospray ionization mass spectrometry (DESI-MS), direct analysis in real time mass spectrometry (DART-MS), or the like.

Also, a method of diagnosis of a disease uses, as an indicator, a pattern of secondary ion mass (m/z) peaks measured by the method for quantification of biomolecules.

The disease is not limited as long as it does not hinder achievement of the objects of the present invention, but may be gastric cancer.

The pattern is not limited as long as it does not hinder achievement of the objects of the present invention, but may have a secondary ion mass normalized as a total of cumulative intensities or as intensities of certain peaks in 1 to 1,000 regions.

The method of diagnosis of a disease is not limited as long as it does not hinder achievement of the objects of the present invention, but the disease may be diagnosed by a change in positions of the secondary ion mass peaks, a change in intensities of the secondary ion mass peaks, disappearance of the secondary ion mass peaks, generation of the secondary ion mass peaks, or combinations thereof by comparing one or more reference patterns selected from a normal pattern, which is a pattern composed of secondary ion mass peaks from biological samples of normal persons who do not have the disease, and a disease pattern, which is a pattern composed of secondary ion mass peaks from biological samples of patients who have the disease, with a target pattern, which is a pattern composed of secondary ion mass peaks from biological samples of persons having a potential to have the disease.

Advantageous Effects

The method for high-sensitivity and high-specificity detection of biomolecules by using mass spectrometry, according to the present invention, enables high-sensitivity and high-specificity detection of biomolecules by using surface mass spectrometry, and the method is also expected to be used for diagnosis and prediction of diseases by quantifying, from a biosample, a target probe, such as miRNA, an antigen, and the like, which is known as a disease marker.

BRIEF DESCRIPTION OF THE DRAWINGS

FIG. 2A-C shows a mechanism of action for forming an insoluble product by an enzymatic reaction of alkaline phosphatase (AP), and intensities of peaks according to a concentration of interferon gamma (IFN-γ).

FIG. 3A-D shows ToF-SIMS spectra of enzymatic reaction products of 3-amino-9-ethylcarbazole, 4-chloro-2-methylbenzenediazonium/3-hydroxy-2-naphthoic acid 2,4-dimethylanilide phosphate, and 5-bromo-3-indolyl β-D-galactopyranoside with HRP, AP, and β-gal.

DESCRIPTION OF THE INVENTION

Figure 1A:
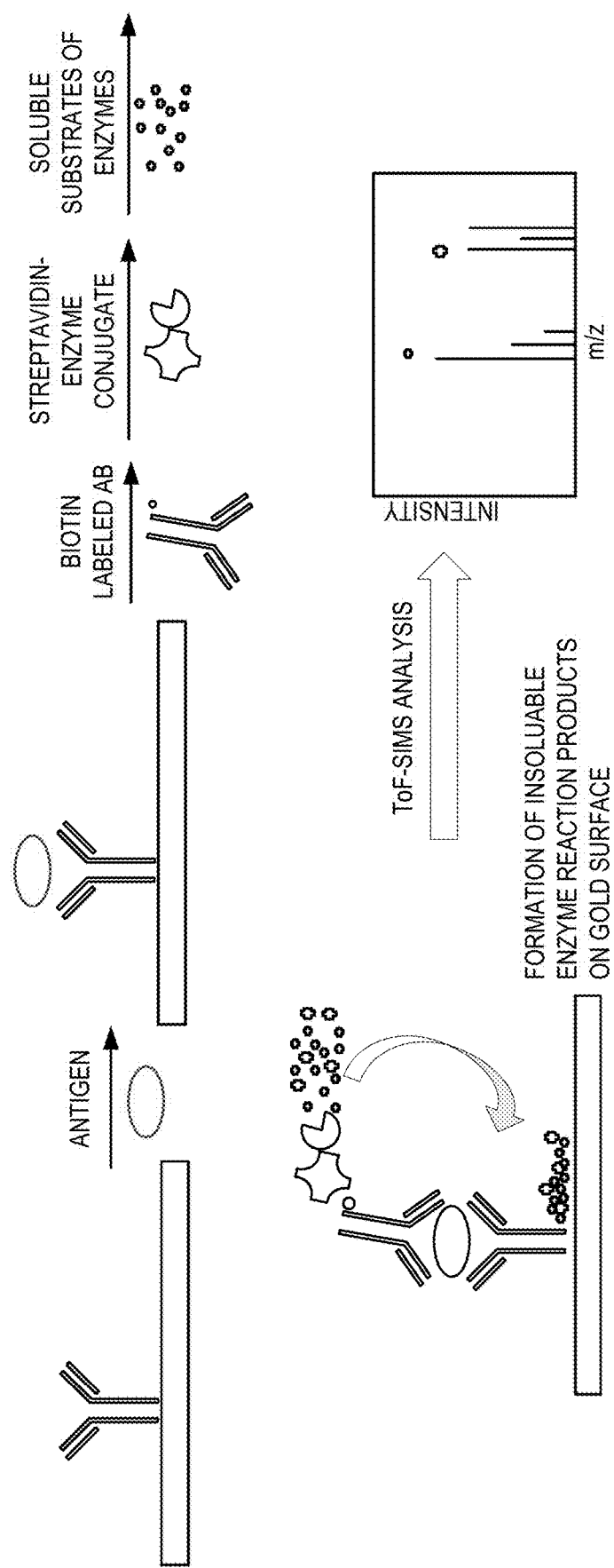
FIG. 1A shows a strategy for detection of an antigen.
Figure 1B:
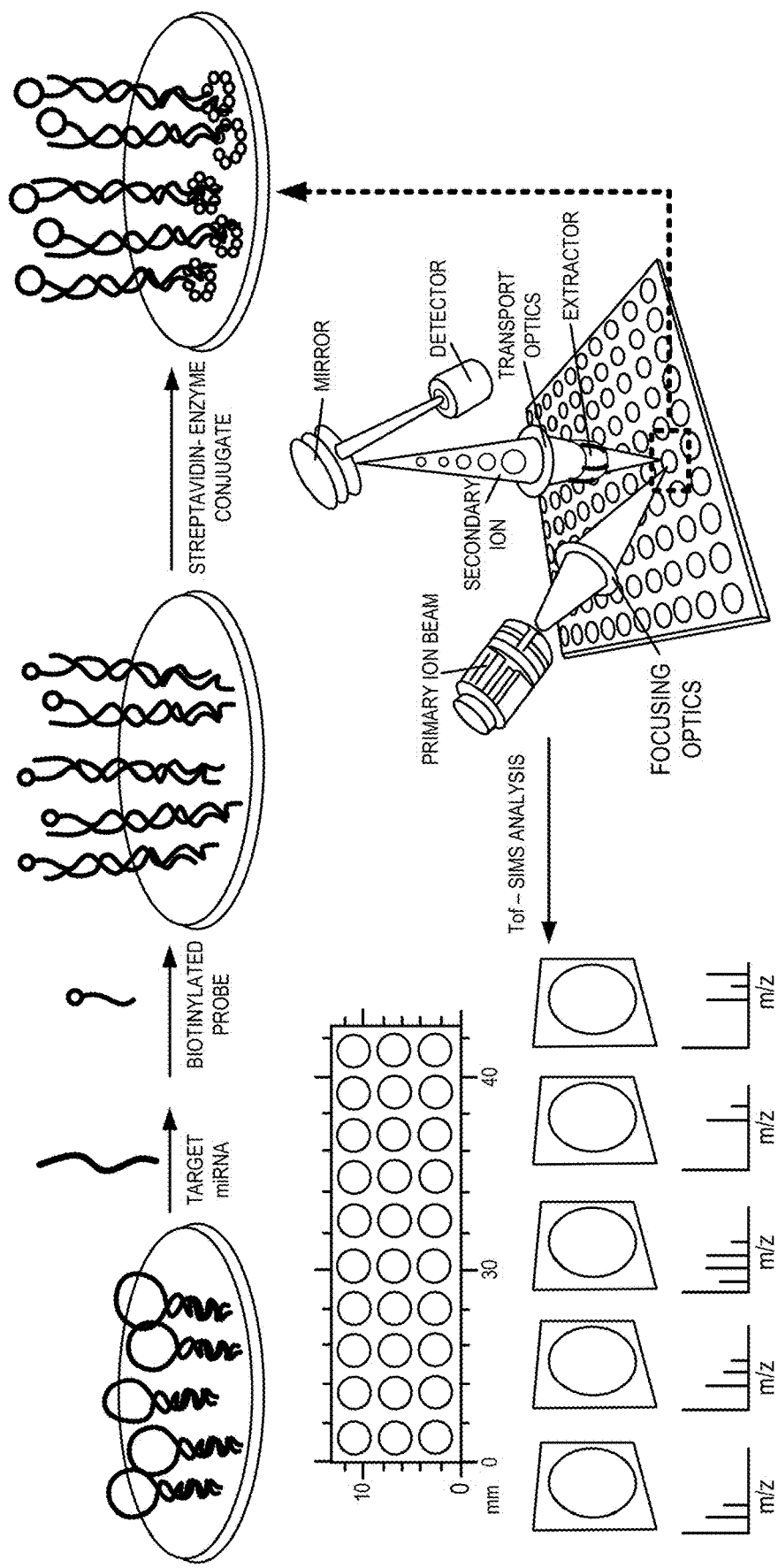
FIG. 1B shows a signal amplification strategy for supersensitivity detection of miRNA by ToF-SIMS using an enzymatic reaction.

A) A product of BCIP/NBT from ToF- and AP reactions, which is reconstructed by peaks at m/z 196.97 (blue), 608.3 (green) and 748.3 (red) that correspond to Au (from a gold chip) that is an AEC product from a HRP reaction. B) A ToF-SIMS spectrum and an image (intercalated, blue) of a peak at m/z 352.0 that corresponds to a product of 4-CN from a HRP enzymatic reaction. C) A ToF-SIMS spectrum and an image (intercalated, green) of a peak at m/z 748.3 that corresponds to a product of BCIP/NBT from an AP enzymatic reaction. D) A ToF-SIMS spectrum and an image (intercalated, red) of a peak at m/z 231.1 that corresponds to a product of S-gal from a 3-gal enzymatic reaction.

BEST MODE

Hereinafter, a method for high-sensitivity and high-specificity detection of biomolecules by using mass spectrometry of the present invention will be described in detail with reference to the appended tables and accompanying drawings.

As shown in the drawings, this is provided by way of example to sufficiently convey the scope of the present invention to those skilled in the art. Therefore, the present invention is not limited to the drawings presented hereinbelow, and may be embodied in various forms. In this case, parts in the drawings may be shown in an exaggerated fashion in order to make the scope of the present invention clear.

In this case, unless otherwise defined, all technical and scientific terms used herein have the same meaning as commonly understood by one of ordinary skill in the art to which the present invention pertains. In the following description and the accompanying drawings, a description of known functions and configurations, which unnecessarily obscure the subject matter of the present invention, will be omitted.

According to the present invention, the term "sample" or "specimen" refers to a target to be analyzed, and is used as the same meaning throughout this specification.

According to the present invention, a "probe" refers to a substance used to detect a certain molecule, and is used as the same meaning throughout this specification.

According to the present invention, a "signal" refers to a signal used for inspection, and is used as the same meaning throughout this specification.

According to the present invention, an "antibody" is the term known in the related art, refers to a specific immuno-globulin directed to an antigenic site, and is used as the same meaning throughout this specification.

Hereinafter, the present invention will be described in detail.

The present invention relates to a method for quantification of biomolecules by using mass spectrometry, which includes generating a precipitate by means of an enzymatic reaction in which a substrate reacts with an enzyme to which biomolecules are bound.

In the present invention, the precipitate is an insoluble material formed by changing a substrate described below using an enzyme, and may be formed on a surface of a metal, the reason for which is not known. However, it was confirmed that the precipitate has a novel effect of reducing error occurrence in mass spectrometric analysis because it may have an adhesive property, and thus, does not get washed out with other impurities even when a surface of the metal is washed for mass spectrometric analysis.

In the present invention, the method for quantification of biomolecules is not limited as long as it does not hinder achievement of the objects of the present invention, but may further include the following steps to quantify the biomolecules:
  fixing a first probe molecule in a metal; and
  reacting the biomolecules with the fixed first probe molecule to form a biomolecule complex.

Also, in the present invention, the method for quantification of biomolecules is not limited as long as it does not hinder achievement of the objects of the present invention, but may further include the following steps to quantify the biomolecules. The following steps may be sequentially after the step of forming the biomolecule complex:
  reacting a second probe molecule with the biomolecule complex, which is formed by reacting the biomolecules with the fixed first probe molecule, so that the second probe molecule binds to the biomolecule complex; and
  binding an enzyme conjugate to the bound second probe molecule.

From one exemplary embodiment of the present invention, the first probe molecule specifically bound to the biomolecules via a complementary bond, and the like without labeling. Thereafter, the first probe molecule was hybridized with a biotinylated signaling probe, and a streptavidin-enzyme conjugate or the like bound to biotin of the hybridized signaling probe. Then, a soluble substrate was subjected to an enzymatic reaction to form insoluble products (mass fingerprints). The organic molecules thus formed were analyzed by means of time-of-flight secondary ion mass spectrometry (ToF-SIMS), matrix-assisted laser desorption/ionization mass spectrometry (MALDI), laser desorption/ionization mass spectrometry (LDI), desorption electrospray ionization mass spectrometry (DESI-MS), direct analysis in real time mass spectrometry (DART-MS), or the like. Hereinafter, the respective steps are described in detail in order to quantify the biomolecules.

A first probe molecule may be fixed on a surface of a metal through functional group-modification as will be described below. In this case, types of the metal are not limited as long as they do not hinder achievement of the objects of the present invention, but may, for example, be suitably selected from metals such as gold (Au), silver (Ag), copper (Cu), aluminum (Al), platinum (Pt), and the like. In this case, the metal may be used after being prepared in the form of an alloy thereof, but the present invention is not limited thereto.

Next, a biomolecule complex is formed through complementary interaction between the first probe molecule and the biomolecules, as will be described below, by mixing biomolecules included in a specimen to be analyzed with the fixed first probe molecule so that the biomolecules react with the first probe molecule.

Then, a second probe molecule enabling binding to an enzyme complex as described below is reacted with the formed biomolecule complex to form a biomolecule complex-second probe molecule complex.

The second probe molecule may recognize a material conjugated with an enzyme, which reacts with a certain substrate, to specifically bind to the material, as will be described below. Then, a soluble substrate may be added under the action of the enzyme to generate an insoluble precipitate, and the insoluble precipitate may be then analyzed by the mass spectrometry to perform quantification of the biomolecules.

Based on the results according to one exemplary embodiment of the present invention, it was confirmed that the quantitative analysis method according to the present invention enables exact measurements even when the biomolecules are present at a trace of $10^{-18}$ M (1 atto M; 1 aM) for analysis of the biomolecule specimen, and thus has a surprising effect of approximately 1,000-fold sensitivity improvement, compared to the prior art.

In the present invention, the biomolecules are not limited as long as they do not hinder achievement of the objects of the present invention, but may be cells, DNA, RNA, a gene, a small-molecule material, microRNA (miRNA), or a protein.

A range of the cells are not limited as long as they do not hinder achievement of the objects of the present invention, but may include analyzable cells such as animal cells, plant cells, fungal cells, bacterial cells, and the like. For example, the cells may include cancer cells, immune cells, and the like for diagnosis of diseases, but the present invention is not limited thereto.

A range of the small-molecule material is not limited, but may usually include a small organic compound having a molecular weight of 900 Da or less. The small-molecule material, when present in vivo, has various biological functions as a signal material in cells, and thus may be a secondary metabolite of natural origin or may also be artificially synthesized, and may have pharmacological activities and/or harmfulness as well.

The small-molecule material may be used to identify a mechanism of action in the field of molecular biology because it may modulate various cellular activities, and may inhibit functions of a protein having various functions or may have a function of interfering with a protein-protein interaction.

The small-molecule material as the biomolecules is not a protein, and the biomolecules such as polysaccharides, and the like are not a small-molecule material. However, as one example of a monomer constituting them, nucleotides or amino acids, or oligomers such as lower polymers, and the like may be included in the small-molecule material.

In the present invention, the first probe molecule is not limited as long as it does not hinder achievement of the objects of the present invention, but may be fixed on a surface of a metal through functional group-modification. Types of the functional group for modification may vary according to the type of the metal. According to one exemplary embodiment of the present invention, when the metal is gold (Au), the modification using the functional group may include thiol-modification.

When the first probe molecule is allowed to have a certain functional group through the modification, it is desirable that the first probe molecule may stably bind to a surface of the metal, and may form a self-assembled monolayer.

The first probe molecule is not limited as long as it can form a specific bond with the biomolecules because it includes a sequence complementary to the biomolecules. As one example, the first probe molecule may include DNA, a peptide nucleic acid (PNA), a locked nucleic acid (LNA), both of which are in a modified form of DNA, an antibody, and the like. The first probe molecule may also be provided after the first probe molecule is diluted in a buffer solution, and the buffer solution may include phosphate-buffered saline (PBS), and the like, but the present invention is not limited thereto.

In the present invention, the enzyme conjugate is not limited as long as it does not hinder achievement of the objects of the present invention, but may be a conjugate in which a material interacting with the second probe molecule is conjugated with an enzyme.

The enzyme conjugate may also be in the form of a functional group enabling a host-guest interaction, and one example of the enzyme conjugate may be in the form of a streptavidin-enzyme bond, a digoxigenin, (DIG)-anti-DIG bond, and the like according to the type of the biomolecules, but the present invention is not limited thereto.

In the present invention, the protein is not limited as long as it does not hinder achievement of the objects of the present invention, but may be an antigen.

An antigen is a material that causes an immune response to produce antibody, and generally includes all types of materials regarded as foreign substances in living organisms. Types of the antigen are not limited, but may be mainly proteins such as pathogens, viruses, or the like. In addition to the proteins, various materials such as polysaccharides, artificially synthesized materials, haptens, variant cells (cancer cells) occurring inside the body of a patient himself or herself, and the like may also be included in the antigen.

Types of the antigen may include an immunogen, a tolerogen, an allergen, or the like, but the present invention is not limited thereto. The immunogen is a material that cause an immune response when it enters the body, and may be a polymeric material including a protein, a polysaccharide, and the like. An ability of the immunogen to cause an immune response depends on a degree of frequency in a host, a size of a molecule, a difference in a chemical configuration. The tolerogen is an antigen that causes an immunological tolerance due to the structure of the molecule, and can be changed into an immunogen with a change in a molecular structure thereof. Also, the allergen is a material that causes an allergic reaction, and may enter the body through routes such as digestion, intake, injection, skin contact, and the like.

In the present invention, when the biomolecules are an antigen, the first probe molecule is not limited as long as it does not hinder achievement of the objects of the present invention, but may be an antibody that binds to the biomolecules.

The antibody refers to a specific immunoglobulin that is directed to an antigenic site. Types of the antibody are not limited, but may include a polyclonal antibody, a monoclonal antibody, or a recombinant antibody, and may include all types of immunoglobulin antibodies. The antibody generally refers to an intact form of an antibody that has two full-length light chains and two full-length heavy chains, and may also include special antibodies such as humanized antibodies, and the like. The polyclonal antibody may be prepared by injecting an immunogen such as a biomarker protein, or a fragment thereof into an external host using conventional methods known to those skilled in the art. The external host is not limited, but mammals such as a mouse, a rat, a sheep, and a rabbit may be used as the external host. When the immunogen is injected in a mode of intramuscular, intraperotoneal or subcutaneous injection, the immunogen may be generally administered with an adjuvant for enhancing antigenicity. Then, blood may be periodically taken from the external host to collect serum that exhibits an improved titer and specificity against an antigen, or an antibody may be separated from the serum, and purified.

The monoclonal antibody may be prepared by technology for producing an immortalized cell line by fusion known to those skilled in the art. A method of preparing a monoclonal antibody will be described in a simple fashion. The protein may be purified and used a suitable amount of approximately 10 µg to immunize a Balb/C mouse, or a polypeptide fragment of the protein may be synthesized and binds to bovine serum albumin to immunize the mouse. Thereafter, antigen-producing lymphocytes isolated from the mouse are fused to human or mouse myeloma cells to produce an immortalized hybridoma, and only the hybridoma cells producing a desired monoclonal antibody may be selected and proliferated, followed by separation and purification of the monoclonal antibody from a culture broth using an ELISA method. Also, antibodies against a commercially available protein may be purchased and used as the monoclonal antibody.

In the present invention, the biomolecules are not limited as long as they do not hinder achievement of the objects of the present invention, but may be microRNA (miRNA).

In the present invention, the first probe molecule is not limited as long as it does not hinder achievement of the objects of the present invention, but may be in the form of a hairpin structure or a guanine quadruplex (G-quadruplex) which includes a sequence complementary to the biomolecules. For example, when the biomolecules are microRNA, the first probe molecule may be LNA, but the present invention is not limited thereto. It is more desirable that the first probe molecule has a structure similar to DNA through the configuration and may use high sequence specificity of LNA that strongly binds to a complementary oligonucleotide. According to one exemplary embodiment of the present invention, it was confirmed that a probe having a hairpin structure, which may complementarily bind to the biomaterial to be analyzed as described above, may be used to distinguish the biomolecules to be analyzed even when one or more sequence mutations occur in the biomolecules to be analyzed. Therefore, it was confirmed that it is possible to detect biomolecules to be analyzed with high sensitivity.

In the present invention, the second probe molecule is not limited as long as it does not hinder achievement of the objects of the present invention, but may include a biotinylated signaling probe, and the enzyme conjugate may bind to the biotinylated signaling probe so that the enzyme conjugate may be fixed in the biotinylated signaling probe.

In the present invention, the enzyme is not limited as long as it does not hinder achievement of the objects of the present invention, but may include any one or two or more selected from the group consisting of horseradish peroxidase (HRP), alkaline phosphatase (AP), and β-galactosidase (β-gal).

The enzyme may react specifically with each of substrates, as will be described below, to convert a soluble material into an insoluble material, which may in turn settle to generate a precipitate.

In the present invention, the substrate is not limited as long as it does not hinder achievement of the objects of the present invention, but may include any one or two or more selected from the group consisting of 4-chloronaphthol, 3,3'-AEC(3-amino-9-ethylcarbazole (DAB), 3,3',5,5'-tetramethylbenzidine (TMB), 5-bromo-4-chloro-3-indolyl phosphate (BCIP)/nitro blue tetrazolium (NBT), 4-chloro-2-methylbenzenediazonium/3-hydroxy-2-naphthoic acid 2,4-dimethylanilide phosphate (TR/Naphthol AS-MX), 5-bromo-4-chloro-3-indolyl β-D-galactopyranoside (X-gal), 3,4-cyclohexenoesculetin β-D-galactopyranoside (S-gal), 5-bromo-3-indolyl β-D-galactopyranoside (Bluo-gal), and 6-chloro-3-indolyl-β-D-galactopyranoside (Red-gal). For example, when 4-CN is used, an enzymatic reaction may be relatively more easily promoted, compared to the other substrates. When BCIP/NBT is used, a relative increase in amount of the precipitate may be caused, compared to the other substrates. The increase in the precipitate may induce a change in index of refraction around the metal in which the first probe molecule is fixed, thereby realizing sensitivity improvement when the precipitate is quantified by ToF-SIMS.

In the present invention, the mass spectrometry is not limited as long as it does not hinder achievement of the objects of the present invention, but one example of the mass spectrometry may be surface mass spectrometry. More specifically, the mass spectrometry may be time-of-flight secondary ion mass spectrometry (ToF-SIMS), matrix-assisted laser desorption/ionization mass spectrometry (MALDI-mass spectrometry or MALDI-MS), laser desorption/ionization mass spectrometry (LDI-MS), desorption electrospray ionization mass spectrometry (DESI-MS), direct analysis in real time mass spectrometry (DART-MS), or the like.

Measurement of a mass spectrum of a specimen using a time-of-flight secondary ion mass spectrometric (TOF-SIMS) apparatus is performed by using the principle that secondary ions are generated by primary ions from a surface of a specimen, and the time when the secondary ions thus generated reach a detector varies according to the mass of the secondary ions. That is, the minimum of molecular fragmentation of molecules on a surface of the specimen may be used to analyze the identities of elements and compounds in the specimen.

The primary ions used in the time-of-flight secondary ion mass spectrometry are not limited, but may be ones selected from ion sources including Bi and Cs. A dose of the primary ions irradiated to the specimen is not limited, but may be $10^{13}$ ions/cm$^2$ or less, desirably in a range of $10^5$ ions/cm$^2$ to $10^{13}$ ions/cm$^2$, and more desirably in a range of $10^7$ ions/cm$^2$ to $10^{10}$ ions/cm$^2$. When the dose of the primary ions irradiated is limited to this range, it is desirable that the destruction of molecules constituting a surface of the specimen may be minimized, thereby making it possible to distinguish the specimen in a non-destructive manner.

A spectrum range of the specimen is not limited as long as it does not hinder achievement of the objects of the present invention, but peaks may exist in a mass value range of 0 to 1,000 m/z, desirably 100 to 700 m/z, and more desirably 200 to 400 m/z.

In the matrix-assisted laser desorption/ionization mass spectrometry (MALDI-mass spectrometry or MALDI-MS), when a biochemical material (a peptide, a protein, etc.) and a synthetic polymer, which have not been easily generated into gas-phase ions, are dissolved by mixing with a matrix material, dropped onto a specimen plate, and dried, the matrix material is left as crystals on the plate together with a target to be analyzed. The specimen plate thus prepared is irradiated with a laser to ionize the matrix material, which makes it possible to perform mass spectrometric analysis.

The matrix material refers to an organic compound that has a structure easily excited by UV laser beams. In this case, two or more mixed solvents may be used to easily dissolve the organic compound and dissolve a target specimen to be analyzed as well.

For example, organic materials such as alpha-cyano-4-hydroxycinnamic acid (CHCA), 2,5-dihydroxybenzoic acid (DHB), and the like may be used as the matrix material. Because small molecules having a mass of less than 500 m/z in the matrix are autonomously decomposed by laser upon analysis, the analysis results of the specimen to be analyzed are mixed in a small mass range, resulting in an interference phenomenon. Therefore, it is desirable that a material having a molecular weight of 1 kDa or more, and desirably, 1 kDa to 100 kDa, is used as the matrix material in the specimen to be analyzed.

In the laser desorption/ionization mass spectrometry (LDI-MS), the interference phenomenon serving as the disadvantage of the MALDI-mass spectrometry occurs while measuring molecules with a low molecular weight mass. Therefore, various types of metal/semiconductor nanoparticles (NPs), carbon nanoparticles, and the like may be used to solve the interference phenomenon.

The direct analysis in real time mass spectrometry (DART-MS) that is a representative plasma-based ambient ionization method may ionize a target compound component in a solid- or liquid-phase specimen by exposing the specimen to a spray stream of water molecules in an excitation state with which a heated gas is mixed. Meanwhile, the desorption electrospray ionization mass spectrometry (DESI) that is a representative spray-based ambient ionization method may ionize components in a specimen by spraying charged droplets of a solvent onto the specimen. This ambient ionization method has advantages in that no special sample for ionization needs to be prepared, it is favorable in terms of costs due to a simple structure of an ion source, and it is easy to handle because only an inert gas need to be supplied from the outside for the ionization, and the like.

Also, the present invention relates to a method for diagnosis of a disease using, as an indicator, a pattern of secondary ion mass (m/z) peaks measured by the quantification method.

A pattern that may be used to diagnose a disease may be constructed from the positions of secondary ion mass (m/z) peaks, the intensities of the peaks, or combinations thereof, which are obtained by measuring a biomolecule specimen or a biological sample by time-of-flight secondary ion mass spectrometry (ToF-SIMS), matrix-assisted laser desorption/ionization (MALDI) mass spectrometry, or laser desorption/ionization (LDI) mass spectrometry. In this case, criteria that may be used to distinguish diseases may be set based on the presence of peaks in a certain secondary ion mass (m/z) position, a change in intensity in the pattern, and the like, but the present invention is not limited thereto. Therefore, the type, number, and distinguishing criterion of the pattern may be differently set according to the type of the biomolecule specimen or sample.

In the present invention, the disease is not limited as long as it does not hinder achievement of the objects of the present invention, but may gastric cancer.

The method for diagnosis of gastric cancer may be performed using, as an indicator, the pattern of secondary ion mass (m/z) peaks of the biomolecule specimen or biological sample measured using the time-of-flight secondary ion mass spectrometry, but the present invention is not limited thereto.

In the present invention, the pattern is not limited as long as it does not hinder achievement of the objects of the present invention, but the secondary ion mass may be normalized as a total of cumulative intensities or as intensities of certain peaks in 1 to 1,000 regions, desirably in 1 to 400 m/z regions.

In the present invention, the method for diagnosis of a disease is not limited as long as it does not hinder achievement of the objects of the present invention, but the disease may be diagnosed by a change in positions of the secondary ion mass peaks, a change in intensities of the secondary ion mass peaks, disappearance of the secondary ion mass peaks, generation of the secondary ion mass peaks, or combinations thereof by comparing one or more reference patterns selected from a normal pattern, which is a pattern composed of secondary ion mass peaks from biological samples of normal persons who do not have the disease, and a disease pattern, which is a pattern composed of secondary ion mass peaks from biological samples of patients who have the disease, with a target pattern, which is a pattern composed of secondary ion mass peaks from biological samples of persons having a potential to have the disease in order to enhance the accuracy and reliability of diagnosis.

The reference pattern may be the normal pattern or the disease pattern, or may be a combination of these two patterns. In this case, the normal pattern may be obtained by statistical processing of one or more secondary ion mass patterns of the normal persons, and the disease pattern may also be obtained by statistical processing of one or more secondary ion mass patterns of the patients.

It is desirable that each of the normal pattern, the disease pattern, and the target pattern is a pattern having the same secondary ion mass regions of 1 to 1,000 regions, and it is desirable that each pattern is measured under the same conditions for time-of-flight secondary ion mass spectrometric measurement.

Each of the normal pattern, the disease pattern, and the target pattern may be normalized as a total of cumulative intensities or as an average of the total of cumulative intensities of regions (m/z regions constituting a pattern) of the secondary ion mass peaks, and may be normalized as intensities of certain peaks (such as $CH_3^+$) or an average of the intensities of the certain peaks.

For the more effective time-of-flight secondary ion mass spectrometric measurement, the biological sample may be a biological sample which is easily subjected to secondary ionization, and has been usually pretreated to have low surface roughness. However, like the conditions for measurement by the time-of-flight secondary ion mass spectrometry, such pretreatment is performed to obtain effective secondary ion mass peaks, and has a slight influence on the positions or relative intensities (normalized intensities of the respective peaks) of the peaks. Therefore, the method for diagnosis of a disease according to the present invention is not limited by the conditions for pretreatment or time-of-flight secondary ion mass spectrometric measurement of the biological sample.

To minimize an effect of the conditions for pretreatment or time-of-flight secondary ion mass spectrometric measurement of the biological sample, it is also desirable that disease is diagnosed by a change in positions of the peaks, a change in intensities of the peaks, disappearance of the peaks, generation of the peaks, or combinations thereof by measuring secondary ion mass patterns of the biological samples from normal persons, patients, and persons having a potential to have the disease under the same conditions for pretreatment or time-of-flight secondary ion mass spectrometric measurement of the biological sample, and by comparing the target patterns with the reference pattern.

The normal pattern and the disease pattern, which constitute the reference pattern, may be obtained by common statistical processing, and a degree of similarity between the reference pattern and the target pattern may also be realized using a common statistical algorithm.

Hereinafter, the contents of the present invention will be described in more detail with reference to exemplary embodiments thereof. It should be understood that the exemplary embodiments are merely intended to describe the present invention in more detail, but are not intended to limit the scope of the present invention.

[Experimental Materials and Reagents]

Interferon gamma was purchased from Abcam (CA, USA) and used.

An interferon gamma antibody and a biotin-labeled interferon gamma antibody were purchased from Abcam (CA, USA) and used.

A DNA probe was purchased from Genotech (Daejeon, South Korea) and used.

MicroRNA was purchased from BIONEER (Daejeon, South Korea) and used.

MiR-200a-3p (Cat. No. MS00003738, Qiagen, Valencia, CA)

Phosphate-buffered saline (PBS), Dulbecco's modified Eagle's medium (DMEM), RPMI 1640 medium, and fetal bovine serum (FBS) were purchased from Wel-Gene (Gyeongsan, South Korea) and used.

Streptavidin-conjugated enzymes (HRP, AP, and β-gal), and substrates (DAB, AEC, 4-CN, BCIP/NBT, and S-gal), bovine serum albumin (BSA), 3-mercaptopropanol, a Grace Bio-Labs CultureWell™ removable chambered cover glass were purchased from Sigma-Aldrich (St. Louis, MO) and used.

A TRIzol reagent was purchased from Invitrogen (Carlsbad, CA) and used.

SNORD61 (Cat. No. MS00033705, Qiagen, Valencia, CA)

All reagents were used as they are purchased.

[Experimental Method]

1. MicroRNA (miRNA) Measurement

An expression level of miR-200a-3p (Cat. No. MS00003738, Qiagen, Valencia, CA) was analyzed in SNU1 and MKN34 cells using an SYBR Green method.

In measuring microRNA, the microRNA was treated with 10 aM to 100 nM PBS, and then used.

Reverse transcription of RNA was performed according to the manufacturer's instructions using a miScript RT kit (Qiagen, Valencia, CA).

Real-time PCR was performed in a ViiA™ 7 real-time PCR system (Applied Biosystems, Foster City, CA) according to the manufacturer's instructions using an SYBR Green miScript PCR system (Qiagen, Valencia, CA). All the reactions were repeatedly performed in triplicate.

SNORD61 (Cat. No. MS00033705, Qiagen, Valencia, CA) was used as an endogenous control for normalization.

A relative amount of miR-200a-3p in two cell lines was calculated by a $2^{-\Delta\Delta CT}$ method.

2. ToF-SIMS Measurement

All measurements were performed using ToF-SIMS V equipment (IONTOF GmbH, Germany).

The spectra and images were obtained through bi3+ with approximately 0.05 pA in a cycle time of 150 us using analysis ion beams.

For the spectra, an area of analysis was 250 um×250 um, and a primary ion dose density (PIDD) was set to $1.0 \times 10^{11}$ ions/cm$^2$ to ensure a static limit.

The size of a patch was approximately 300 um×300 um, and the PIDD was set to $1.15 \times 10^9$ ions/cm$^2$.

An anion spectrum used $C_2H^-$, $C_3H^-$, $C_4H^-$, $C_5H^-$, and $C_7H^-$ peaks to correct the mass.

The limit of detection (LOD) was calculated using the following equation:

$$LOD=3.3(SD/S)$$

SD: Standard deviation
S: Slope of calibration curve

3. MALDI Measurement

After a CHCA matrix was treated, an insoluble product on a gold chip was measured in a MALDI-ToF cation mode.

4. LDI-MS Measurement

An insoluble product on a gold chip was measured in a cation mode using a MALDI-ToF apparatus.

[Example 1] Detection of Super-Sensitive Protein(Antigen) Using ToF-SIMS

1. Formation of Self-Assembled Monolayers

A gold wafer was prepared by vacuum-depositing a chromium (Cr) film having a thickness of 15 nm, and then depositing a gold layer having a thickness of 100 nm onto the silicon wafer. Thereafter, the gold wafer was treated with a solution obtained by mixing 20 mL of $H_2O_2$, 2 mL of $HNO_3$, and 12 mL of $H_2SO_4$, and then washed.

A gold chip was immersed in a 1 mM concentration of a thiol mixture (1:99=mercaptoundecanoic acid:mercaptoundecanol), reacted overnight, and then washed five times with ethanol/water.

2. Introduction of Antibody onto Gold Chip

The gold chip on which the self-assembled monolayer was formed was treated with N-ethyl-N'carbodiimide hydrochloride/N-hydroxysuccinimde (EDC/NHS) at a concentration of 10 mM, reacted for an hour, and then washed once with PBS. Thereafter, the gold chip was treated with a 0.1 mg/mL concentration of an interferon gamma antibody. The gold chip was reacted at room temperature for 2 hours, and then washed three times with PBS.

3. Antigen Treatment on Gold Chip and Enzymatic Reaction

The gold chip modified with the antibody was treated with 1 nM interferon gamma (an allowable concentration range was in a range of 10 aM to 1 nM) at room temperature.

Next, the mixture was cultured at room temperature for 2 hours, and then washed three times with PBS, and a biotinylated antibody was applied onto the gold chip.

After the mixture was cultured for an hour, the gold chip was washed five times with PBS, and 1% BSA was added to PBS. Then, the resulting mixture was cultured for an hour. A streptavidin-alkaline phosphatase (streptavidin-AP) conjugate solution in PBS to which 1% BSA was added was added to the gold chip at a concentration of 25 ug/mL for an hour.

Then, the gold chip was repeatedly washed with PBS, and then cultured for 10 minutes with a premixed BCIP/NBT solution.

3. Generation of Insoluble Product

After the culture as described above, 5-bromo-4-chloro-3-indolyl phosphate/nitroblue tetrazolium (BCIP/NBT) was added as a streptavidin-AP substrate to form an insoluble product on the gold chip.

4. Quantification Using ToF-SIMS

Figure 2A:
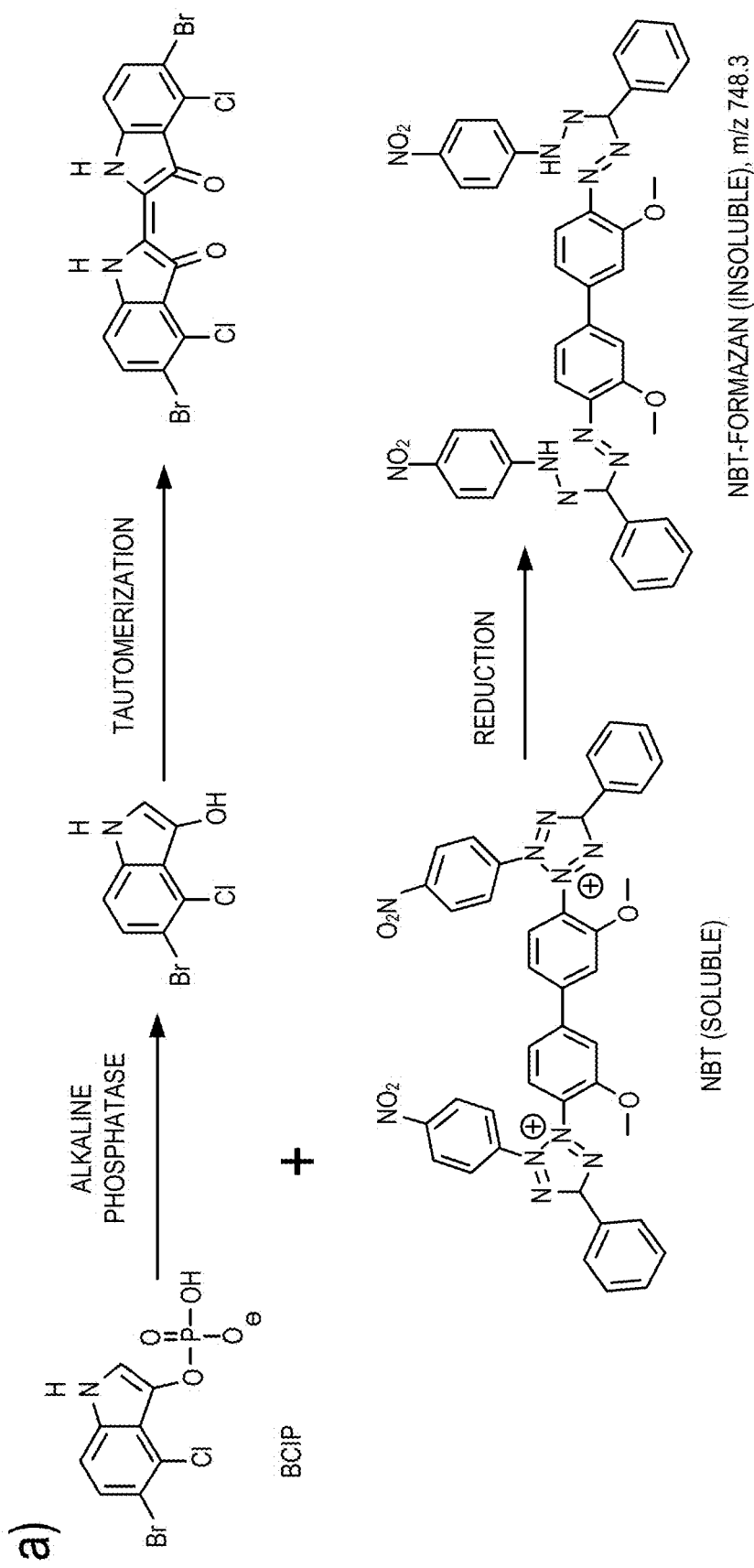

Analysis of the insoluble product was performed using a ToF-SIMS measurement method as described in the section "Experimental Method." The results are shown in FIG. 2.

Figure 2B:
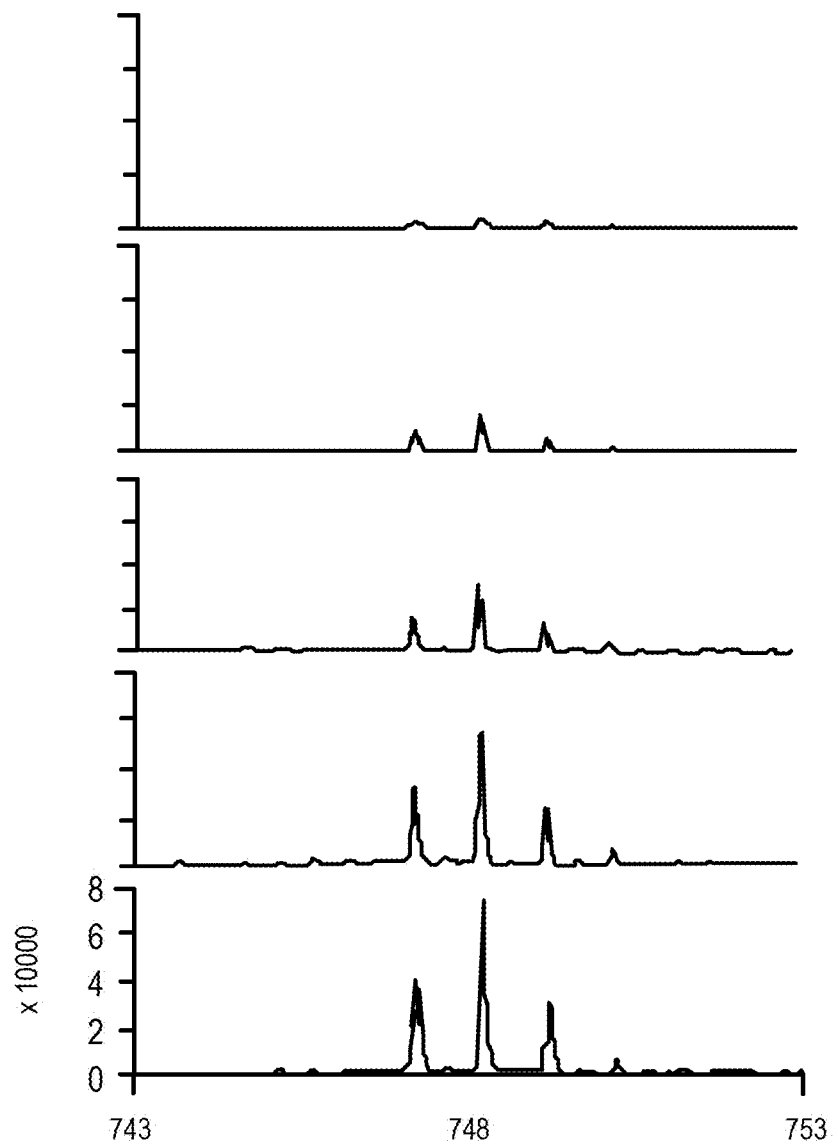

Based on these results, it was confirmed that a peak corresponding to [M]⁻, which is an intact molecule of NBT formazan generated through hydrolysis of BCIP by AP and generated by a decrease in NBT induced by this hydrolysis product, was clearly detected at m/z 748.3 (FIG. 2B).

In FIG. 2C, it was confirmed that the intensity of the peak decreased in an interferon gamma-dependent manner, and the peak had the maximum value at m/z 748.3 in the graph after normalization.

The values of interferon gamma obtained at various concentrations were divided by the total number of ions. As a result, it was confirmed that the linear relationship was observed between the concentration of the interferon gamma and the normalized peak intensity (FIG. 2C).

The limit of detection was calculated to be 130 aM by the calculation equation.

From the results, it was confirmed that an antigen in the protein was detectable with super sensitivity by ToF-SIMS using a novel signal amplification strategy based on the mass fingerprint generated by the enzyme.

[Example 2] Measurement of ToF-SIMS Spectrum of Enzymatic Reaction Product

In Example 1, horseradish peroxidase (HRP) and β-galactosidase (β-gal) were additionally used as the enzyme in addition to the alkaline phosphatase (AP). The ToF-SIMS expression was measured in the same manner as in the other procedures, except that 3-amino-9-ethylcarbazole (AEC), 4-chloro-2-methylbenzenediazonium/3-hydroxy-2-naph-thoic acid/2,4-dimethylanilide phosphate (AS-MX), and 5-bromo-4-chloro-3-indolyl β-D-galactopyranoside (X-gal) were used respectively as the substrates against the aforementioned enzymes. The results are shown in FIG. 3.

Figure 3D:
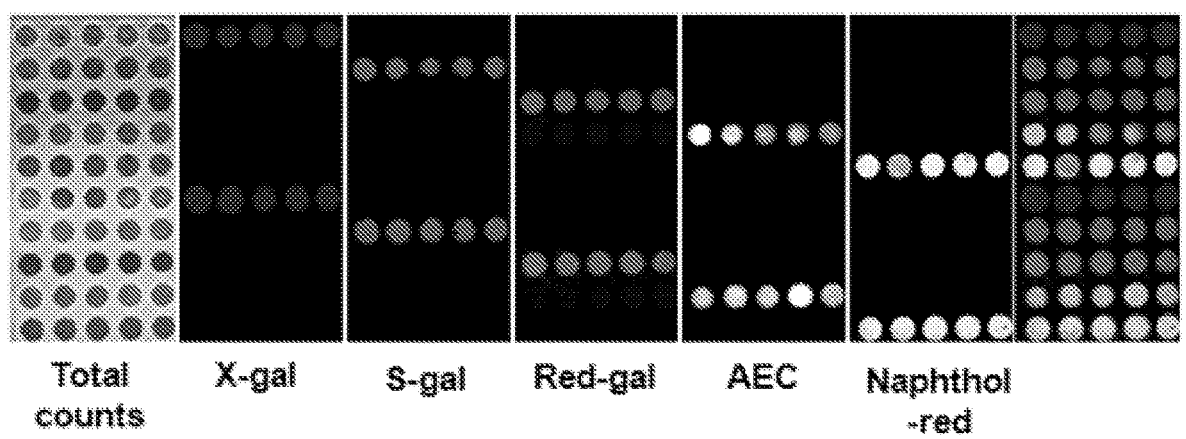

Based on these results, it was confirmed that the peaks of [M-NH2]+, [M+H]+, and [M+] were clearly detected at positions of 608.3, 441.1 and 198.0, respectively, for the insoluble materials generated after the hydrolysis by HRP, AP, and β-gal (FIGS. 3A to 3C).

[Example 3] Measurement of ToF-SIMS Spectrum Using Multiplex Assay

Figure 4:
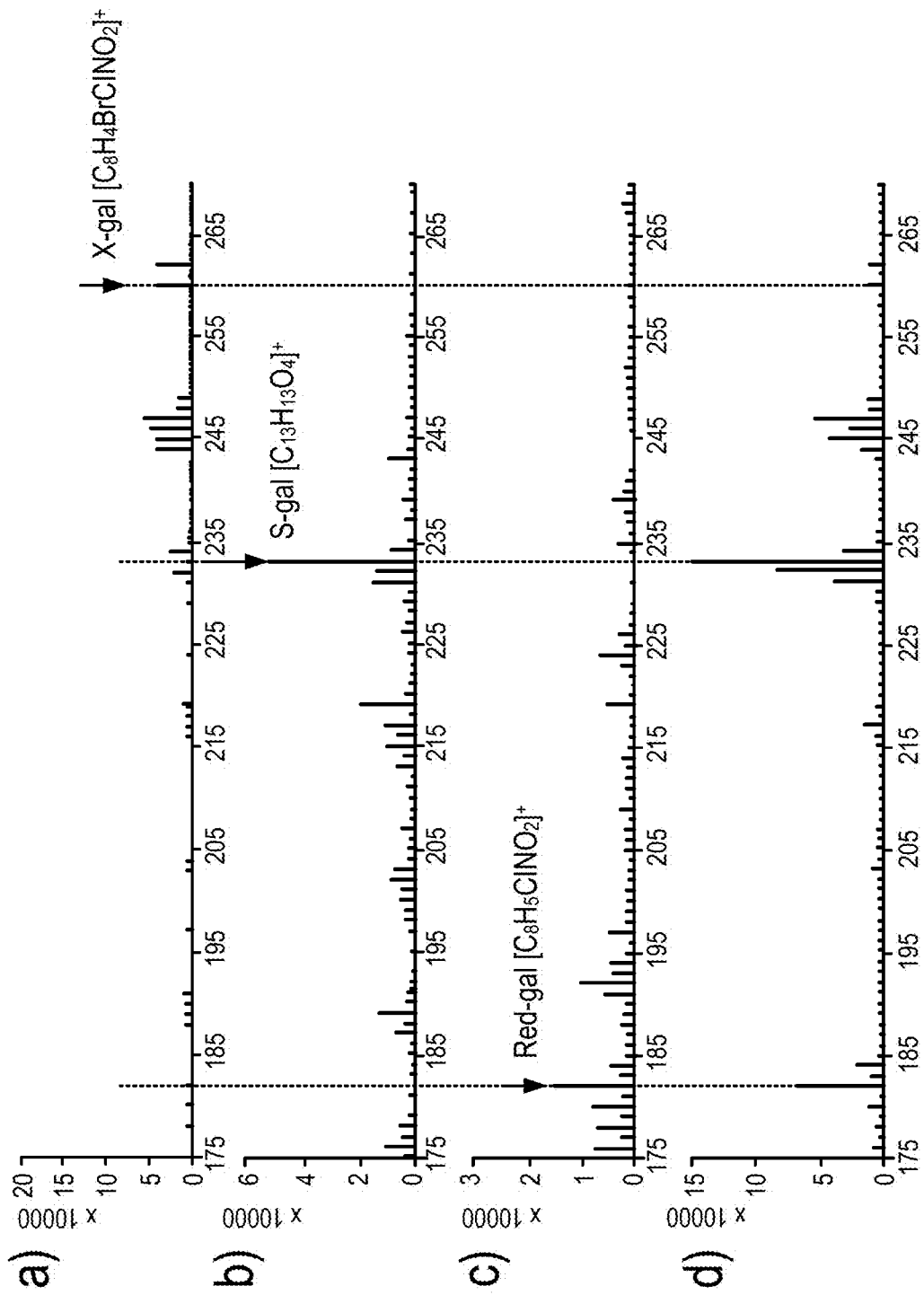
FIG. 4 shows ToF-SIMS spectra of enzymatic reaction products of A) X-gal, B) S-gal, C) Red-gal with β-gal, and D) enzymatic reaction products of three substrates (X-gal, S-gal, and Red-gal) with β-gal using a multiplexed assay in the presence of the 3 substrates.

The ToF-SIMS expression was measured in the same manner as in the other procedures, except that X-gal, S-gal, and Red-gal were used as the substrates in Example 1, and the three substrates were mixed at the same amounts. The results are shown in FIG. 4.

As can be seen from the results, it was confirmed that the positions of the peaks when X-gal, S-gal, and Red-gal were used (FIGS. 4A to 4C) were maintained respectively even when the substrates were mixed, and thus the peaks were measured in the same positions (FIG. 4D).

Based on the results, it can be seen that the ToF-SIMS measurement method according to the present invention enabled the high-sensitivity detection of the insoluble product by using a single substrate, and the analysis peaks intrinsic to the single substrate were maintained for the mixed substrates of X-gal, S-gal, and Red-gal. Based on these results, it was confirmed that the ToF-SIMS measurement method has an effect of allowing a multiplex assay without any interference phenomenon according to the mixture of substrates.

Figure 5:
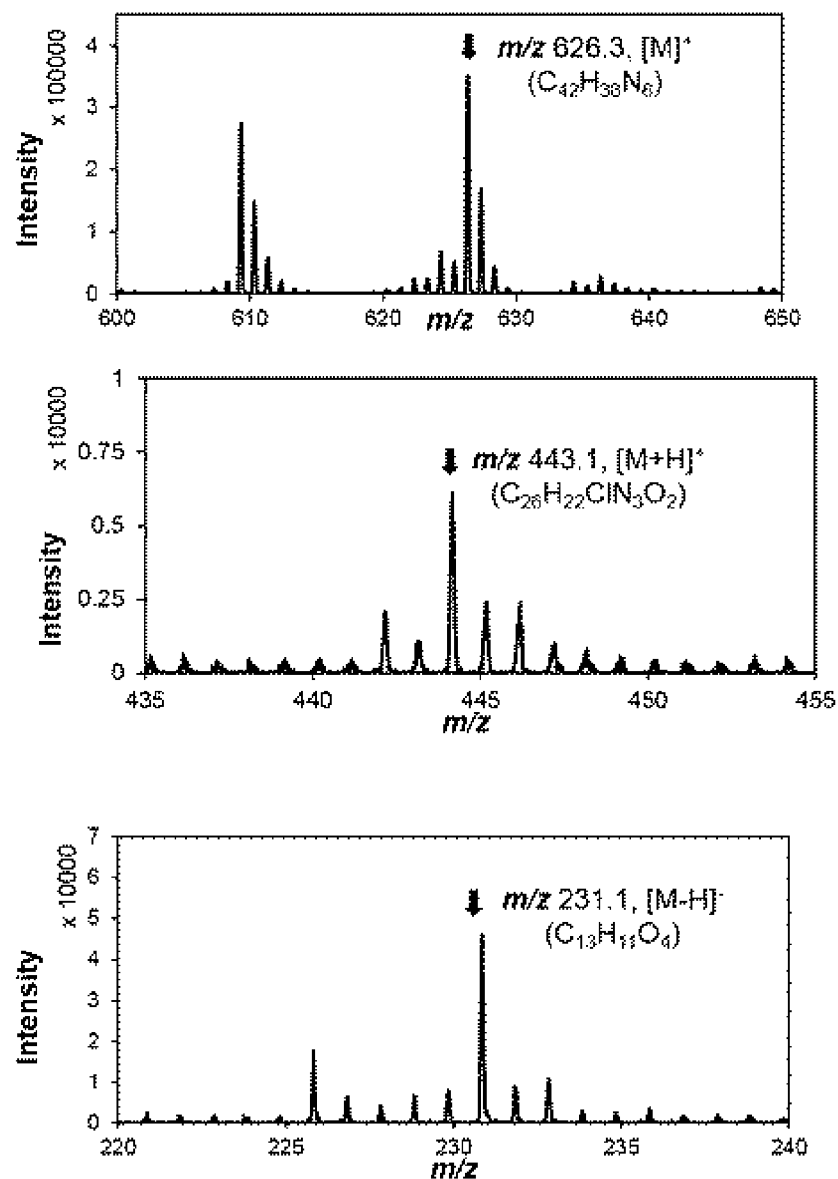
FIG. 5 shows mass spectra obtained through MALDI-ToF and LDI-MS analyses.

[Example 4] High-Sensitivity and High-Specificity Measurement of Biomarker Using MALDI, LDI-MS The mass spectrometric analysis was performed using the MALDI and LDI-MS mass spectrometry instead of the ToF-SIMS used in Example 1. The results are shown in FIG. 5.

As can be seen from the results, it was confirmed that the measurement method according to the present invention overcome the disadvantage upon low mass spectrometric analysis, which was found in the conventional MALDI and LDI-MS measurement method, and thus the interference phenomenon was minimized, and the intrinsic mass of the biosample was detectable with high sensitivity.

[Example 5] Super-Sensitivity Detection of miRNA Using ToF-SIMS

1. Formation of Self-Assembled Monolayers

A gold wafer was prepared by vacuum-depositing a chromium (Cr) film having a thickness of 15 nm, and then depositing a gold layer having a thickness of 100 nm onto a silicon wafer. Thereafter, the gold wafer was treated with a super-pirahana solution obtained by mixing 20 mL of $H_2O_2$, 2 mL of $HNO_3$, and 12 mL of $H_2SO_4$, and then washed.

16-well CultureWell™ cover glasses were introduced onto the gold wafer to prepare a multi-well gold chip.

Prior to formation of a self-assembled monolayer, a DNA probe was annealed at 95° C. for 5 minutes, and then slowly cooled to 4° C. in 10 uM PBS. A hairpin probe solution contained in a PBS solution was seeded on the gold chip at 100 uL/well, and cultured overnight, and the chip was then washed five times with PBS.

2. MiRNA Treatment on Gold Chip and Enzymatic Reaction

The gold chip modified with the probe was treated overnight with 100 nM miRNA in RNase-free PBS (or full-length RNA dissolved in PBS) at room temperature.

Next, the mixture was cultured at 55° C. for an hour, and then washed with PBS at 55° C. for 10 minutes.

After the washing, the gold chip in PBS was cooled to 4° C.

A biotinylated signaling probe was dissolved at a concentration of 500 nM in PBS, and applied to each well on the gold chip.

Sequences of the signaling probes are as listed in the following Table 1.

TABLE 1

| Biotinylated signaling probe | | |
|---|---|---|
| First probe molecule | Sequence (5' to 3') | Modification |
| miR-200a-3p | UAA CAC UGU CUG GUA ACG AUG U | None |

TABLE 1-continued

Biotinylated signaling probe

| First probe molecule | Sequence (5' to 3') | Modification |
|---|---|---|
| miR-let-7a | UGA GGU AGU AGG UUG UAU AGU U | None |
| miR-let-7c | UGA GGU AGU AGG UUG UAU GGU U | None |
| miR-let-7f | UGA GGU AGU AGA UUG UAU AGU U | None |
| Hairpin probe for detection of miR-200a-3p | GCC TAA CAC TGT ACA TCG TTA CCA GAC AGT GTT AGG C | 3'-Thiol |
| Hairpin probe for detection of miR let-7a | GGC AAC TAT ACA ACC TAC TAC CTC ATA TAG TTG CC | 5'-Thiol |
| Signaling probe for detection of miR-200a-3p | AGT GTT AGG C | 3'-Biotin |
| Signaling probe for detection of miR-let-7a | GGC AAC TAT A | 5'-Biotin |

After the culture for 3 hours, the gold chip was washed five times with PBS, and 1% BSA was added to PBS. Thereafter, the resulting mixture was cultured for an hour. A streptavidin-alkaline phosphatase (streptavidin-AP) conjugate solution in PBS to which 1% BSA was added was added to the gold chip at a concentration of 25 ug/mL for an hour. Then, the gold chip was repeatedly washed with PBS, and then cultured for 10 minutes with a premixed BCIP/NBT solution.

3. Generation of Insoluble Product

After the culture as described above, 5-bromo-4-chloro-3-indolyl phosphate/nitroblue tetrazolium (BCIP/NBT) was added as a streptavidin-AP substrate to form an insoluble product on the gold chip.

4. Quantification Using ToF-SIMS

Figure 6:
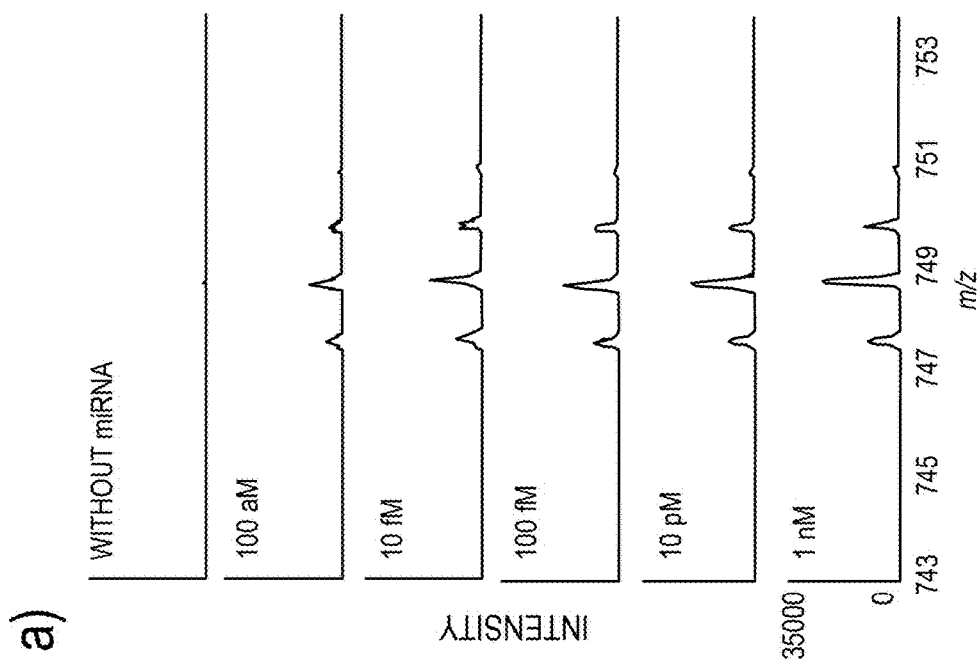
FIG. 6 shows detection of NBT-formazan generated by an enzymatic reaction of alkaline phosphatase (AP) in the presence of miR-let-7a, including A) a spectrum obtained by measuring miR-let-7a on a gold chip at various concentrations by ToF-SIMS, B) a structure of NBT-formazan, and C) the relationship between a normalized intensity and concentration of miR-let-7a, where a data point represents a mean±standard deviation.

Analysis of the insoluble product was performed using a ToF-SIMS measurement method as described in the section "Experimental Method." The results are shown in FIG. 6.

Based on these results, it was confirmed that a peak corresponding to [M]⁻, which is an intact molecule of NBT formazan generated through hydrolysis of BCIP by AP and generated by a decrease in NBT induced by this hydrolysis product, was clearly detected at m/z 748.3 (FIGS. 6A and 6B).

In FIG. 6A, it was confirmed that the intensity of the peak decreased in a miR-let-7a-dependent manner, and the peak had the maximum value at m/z 748.3 in the graph after normalization.

The values of miR-let-7a obtained at various concentrations were divided by the total number of ions. As a result, it was confirmed that the linear relationship was observed between the concentration of the miR-let-7a and the normalized peak intensity (FIG. 6C).

The limit of detection was calculated to be 130 aM by the calculation equation.

From the results, it was confirmed that an antigen in the protein was detectable with super sensitivity by ToF-SIMS using a novel signal amplification strategy based on the mass fingerprint generated by the enzyme. The method according to the present invention was based on the recognition of the non-covalent DNA-RNA interaction, and thus has an advantage in that this is expandable to other biomolecular interactions such as protein-protein, protein-substrate, or RNA-protein interactions.

[Example 6] Measurement of Sensitivity of miRNA to Base Sequence Polymorphism

To measure an effect on analysis results using ToF-SIMS when polymorphism occurred in a miRNA sequence, two controls in which one base was substituted in a sequence of miR-let-7a were mixed to measure detection efficiency.

MiRNAs having sequences of an experimental group and controls as listed in the following Table 2 were mixed, and treated as in Example 1-2.

TABLE 2

| MiRNA experimental group having polymorphism | |
|---|---|
| Material | Base sequence |
| miR-let-7a | UGA GGU AGU AGG UUG UAU AGU U |
| Comparative Example 1 (miR-let-7c) | UGA GGU AGU AGG UUG UAU GGU U |
| Comparative Example 2 (miR-let-7f) | UGA GGU AGU AGA UUG UAU AGU U |

* Letters written in bold in the table represent mutations in a base sequence

To check whether the mixed miRNAs having polymorphism as described above bound to a first probe molecule in competition with a first probe molecule, the gold chip treated with miRNA was heat-treated at 55° C.

The subsequent experiment was performed in the same manner as in Example 5 to measure peaks using ToF-SIMS.

Figure 7:
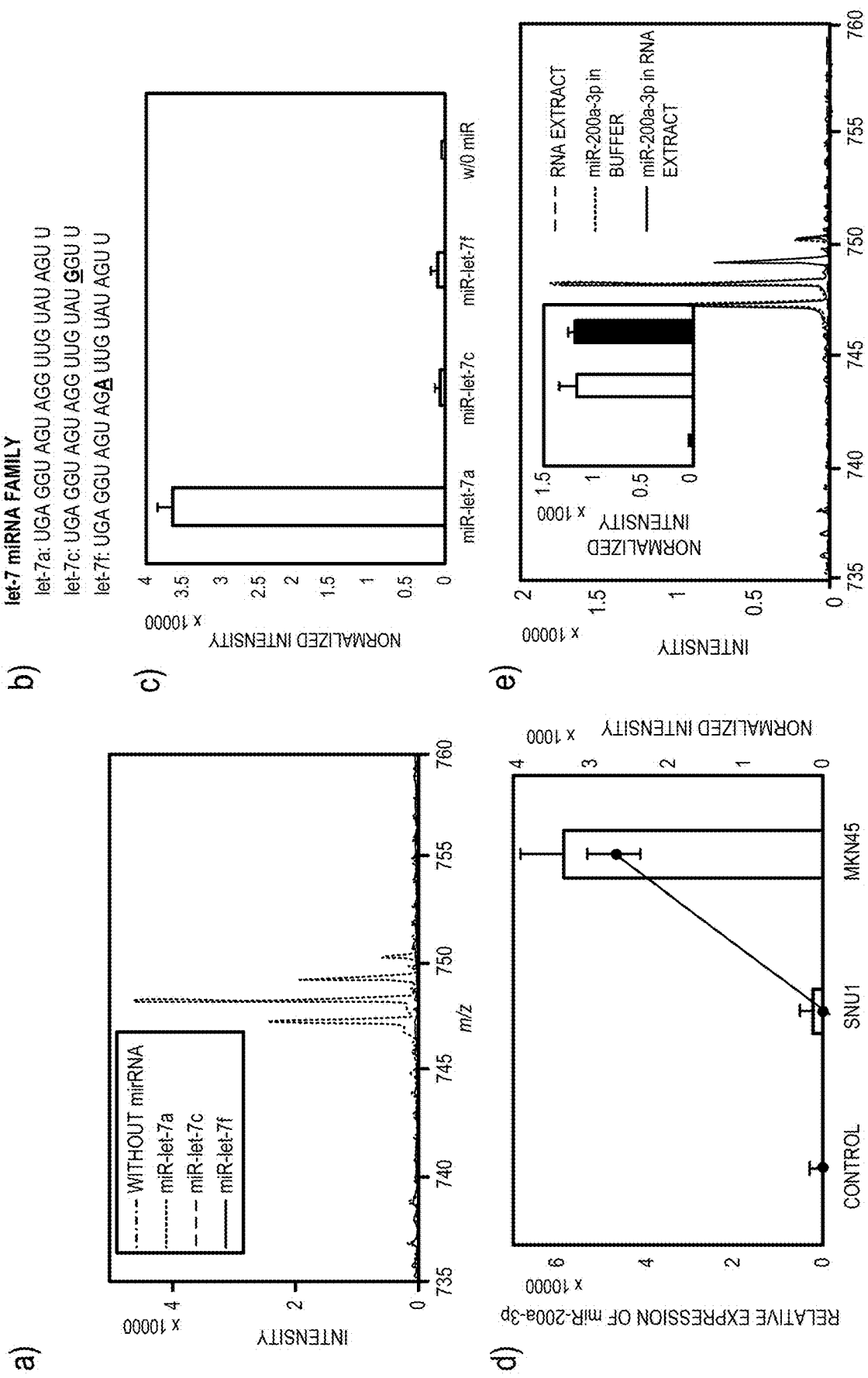
FIG. 7 shows detection of sequence-specific miR-let-7a (A-C) and detection of sequence-specific miR-200a-3p detection (D-E) in a full-length RNA extract from a human primary gastric cancer cell line, including A) a spectrum measured in the presence of miR-let-7a, miR-let-7c, and miR-let-7f by ToF-SIMS, B) Sequences of miRNAs, C) Normalized intensities of peaks at m/z 748.3 in the presence of miR-let-7a, miR-let-7c, and miR-let-7f, D) the relationship between the normalized intensities of peaks at m/z 748.3 measured by ToF-SIMS and an expression level of miR-200a-3p analyzed by RT-PCR, and E) a spectrum measured in the presence of 1 nM miR200a-3p in a buffer and a total RNA extract of a human gastric cancer cell line SNU1 by ToF-SIMS (a gray spectrum and a gray graph).

The results are shown in FIG. 7.

As can be seen from FIGS. 7A to 7C, the intensities of the peaks were checked at m/z 748.3. As a result, it was possible to observe strong peaks in the presence of miR-let-7a, but it was revealed that the measured intensities of the peaks had negligibly small values in the case of the controls (Comparative Examples 1 and 2), compared to the intensity of miR-let-7a.

Based on these results, it was confirmed that the method for amplification of a hairpin-based signal according to the present invention had an advantage in that it was able to distinguish the results produced due to the polymorphism present in the base sequence with high sensitivity without including the gene amplification or sequencing steps.

[Example 7] Detection of miRNA in Cancer Cell Extract

An SNU1 cell line that did not express miR-200a-3p and a MKN45 human gastric cancer adenocarcinoma cell line that expressed miR-200a-3p were subjected to the analysis method according to the present invention to analyze miRNA in a full-length RNA extract.

An RNA extract was obtained from each of the cell lines using a conventional method, and RNA present in each cell line was mixed with miR-200a-3p to perform ToF-SIMS measurement.

As a result, when analyses were performed for buffers containing the RNA extract of the SNU1 cell line and 1 nM miR-200a-3p, there was no significant difference in peak intensity at m/z 748.3.

This indicates that the presence of various types of RNA molecules did not interfere with the specific interaction between certain miRNA and the probe. From these facts, it was newly confirmed that it was possible to use the high sensitivity of the ToF-SIMS analysis method according to the present invention to detect target miRNA using various types of the biological samples.

As shown in FIG. 7D, the NBT-formazan molecule was detected in the full-length RNA extract obtained from the MKN45 cells, but not detected in the full-length RNA extract obtained from the SNU1 cell line. These results are coincident with the results using reverse transcription PCR of RNA (Data not shown).

Also, it was confirmed that the present invention using enzyme-based signal amplification has a new significant effect of enabling the detection of a low-concentration analyte in a complicated environment, which was not achieved by the approach to the conventional technology using the mass spectrometry. Therefore, the present invention has been completed based on these facts.

[Example 8] Multiplex Assay Using ToF-SIMS

To check a multiplex assay for the analysis method of the present invention, ToF-SIMS analysis was performed in the same manner as in the other procedures, except that three enzymes (HRP, AP, and β-gal) were further used as the streptavidin-bound enzymes, and a mixture thereof was used.

Figure 8:
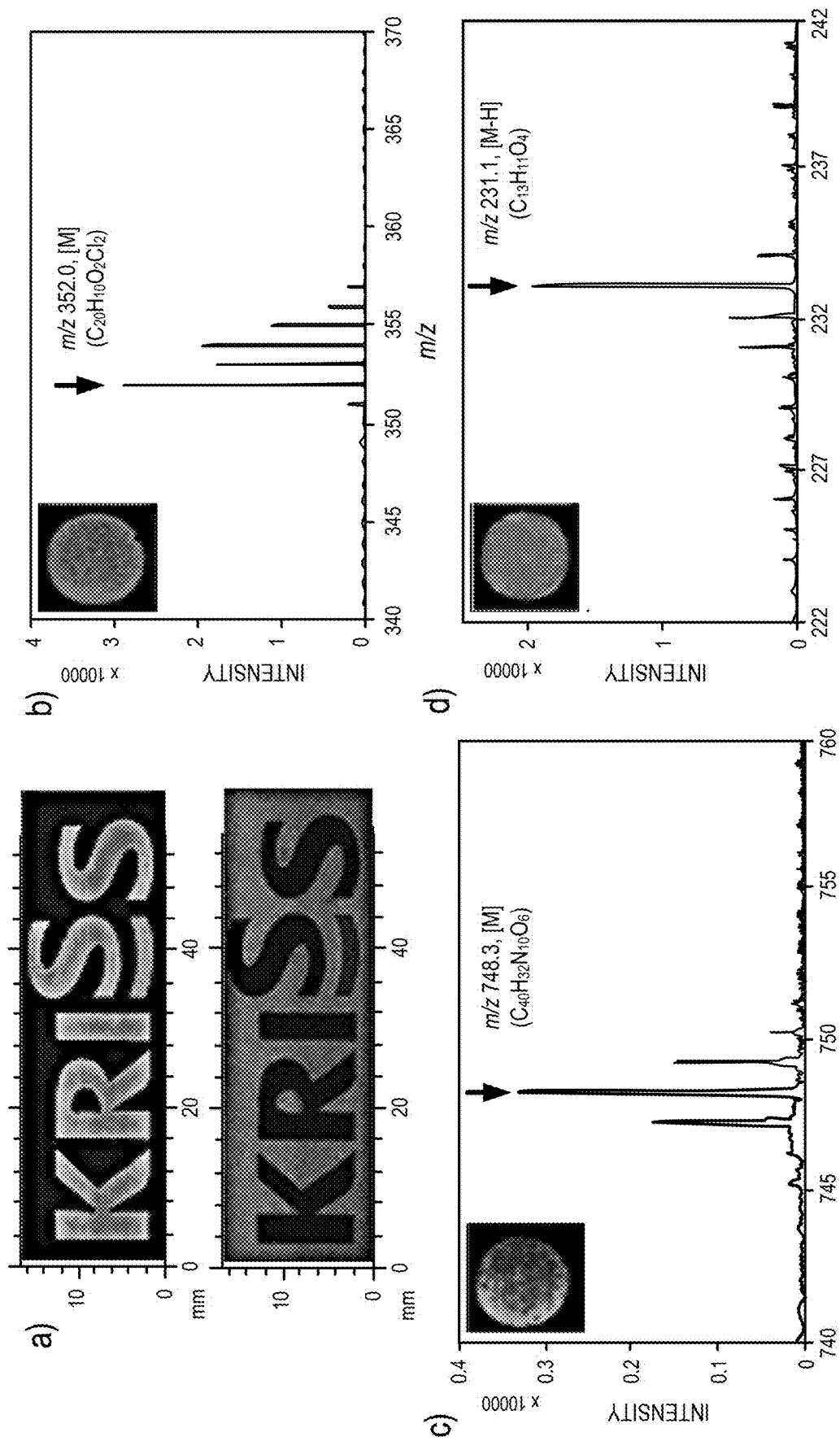
FIG. 8 shows detection of various molecules generated by HRP, AP, and β-gal.

The results are shown in FIG. 8.

From FIG. 8A, chemical images isolated for $[M-NH2]^+$ and $[M]^+$ of the enzymatic reaction products of 3-amino-9 ethyl carbazole (AEC) and BCIP/NBT, which were the substrate of HRP and AP, were observed at m/z 608.3 and 748.3, respectively.

Also, an image of $[Au]^+$ was observed at m/z 196.97 in an outside pattern.

FIGS. 8B to 8D shows the ToF-SIMS analysis results of precipitates generated by three different enzymes HRP, AP, and β-gal. Here, the enzymatic reaction products of 4-chloronaphthol (4-CN) and BICP/NBT by HRP and AP were observed at m/z 352.0 and 748.3, which corresponded to $[M]^-$, respectively. Also, it was observed that the product of 3,4-cyclohexenoesculetin-β-D-galactopyranoside (S-gal) by the β-gal enzymatic reaction was coincident with the deprotonated ions $[M-H]^-$ at m/z 231.1.

Based on these facts, it was confirmed that the present invention enabled a multiplex assay for various types of the enzyme products by using ToF-SIMS.

---

The invention claimed is:

1. A method for quantification of biomolecules by using mass spectrometry, the method comprising:
   generating a precipitate to quantify the biomolecules by:
   i) fixing a first probe molecule in a metal;
   ii) reacting the biomolecules with the fixed first probe molecule to form a biomolecule complex;
   iii) reacting a second probe molecule with the biomolecule complex, which is formed by reacting the biomolecules with the fixed first probe molecule, so that the second probe molecule binds to the biomolecule complex; and
   iv) binding an enzyme conjugate to the bound second probe molecule, wherein the enzyme conjugate is a conjugate in which a material interacting with the second probe molecule is conjugated with the enzyme;
   reacting a substrate with the enzyme of the enzyme conjugate to form an insoluble product; and
   quantifying the insoluble product by using mass spectrometry,
   wherein the biomolecules are microRNA (miRNA).

2. The method of claim 1, wherein the first probe molecule is fixed on a surface of the metal through thiol-modification.

3. The method of claim 1, wherein the first probe molecule has a hairpin structure including a sequence complementary to the microRNA.

4. The method of claim 2, wherein the second probe molecule includes a biotinylated signaling probe, and the enzyme conjugate binds to the biotinylated signaling probe so that the enzyme conjugate is fixed in the biotinylated signaling probe.

5. The method of claim 1, wherein the enzyme is selected from the group consisting of horseradish peroxidase (HRP), alkaline phosphatase (AP), and β-galactosidase (β-gal).

6. The method of claim 1, wherein the substrate is selected from the group consisting of 4-chloronaphthol, 3,3'-AEC (3-amino-9-ethylcarbazole (DAB), 3,3',5,5'-tetramethylbenzidine (TMB), 5-bromo-4-chloro-3-indolyl phosphate (BCIP)/nitro blue tetrazolium (NBT), 4-chloro-2-methylbenzenediazonium/3-hydroxy-2-naphthoic acid 2,4-dimethylanilide phosphate (TR/Naphthol AS-MX), 5-bromo-4-chloro-3-indolyl β-D-galactopyranoside (X-gal), 3,4-cyclohexenoesculetin β-D-galactopyranoside (S-gal), 5-bromo-3-indolyl β-D-galactopyranoside (Bluo-gal), and 6-chloro-3-indolyl-β-D-galactopyranoside (Red-gal).

7. The method of claim 1, wherein the mass spectrometry is time-of-flight secondary ion mass spectrometry (ToF-SIMS), matrix-assisted laser desorption/ionization mass spectrometry (MALDI-mass spectrometry or MALDI-MS), laser desorption/ionization mass spectrometry (LDI-MS), desorption electrospray ionization mass spectrometry (DESI-MS), or direct analysis in real time mass spectrometry (DART-MS).

8. A method of diagnosis of a disease using, as an indicator, a pattern of secondary ion mass (m/z) peaks measured by the method for quantification of biomolecules of claim 1.

9. The method of claim 8, wherein the disease is gastric cancer.

10. The method of claim 8, wherein the pattern has a secondary ion mass normalized as a total of cumulative intensities or as intensities of certain peaks in 1 to 1,000 regions.

11. The method of claim 8, wherein the disease is diagnosed by a change in positions of the secondary ion mass peaks, a change in intensities of the secondary ion mass peaks, disappearance of the secondary ion mass peaks, generation of the secondary ion mass peaks, or combinations thereof by comparing one or more reference patterns selected from a normal pattern, which is a pattern composed of secondary ion mass peaks from biological samples of normal persons who do not have the disease, and a disease pattern, which is a pattern composed of secondary ion mass peaks from biological samples of patients who have the disease, with a target pattern, which is a pattern composed of secondary ion mass peaks from biological samples of persons having a potential to have the disease, in the method of diagnosis of a disease.

* * * * *

UNITED STATES PATENT AND TRADEMARK OFFICE
CERTIFICATE OF CORRECTION

| | | |
|---|---|---|
| PATENT NO. | : 12,435,376 B2 | Page 1 of 1 |
| APPLICATION NO. | : 17/271699 | |
| DATED | : October 7, 2025 | |
| INVENTOR(S) | : Lee et al. | |

It is certified that error appears in the above-identified patent and that said Letters Patent is hereby corrected as shown below:

On the Title Page

Item (73) Assignee, Please change "Korea Advanced Institute of Science and Technology, Daejeon (KR)" to --Korea Research Institute of Standards and Science, Daejeon (KR)--.

Signed and Sealed this
Second Day of December, 2025

John A. Squires
*Director of the United States Patent and Trademark Office*